Patented Feb. 25, 1936

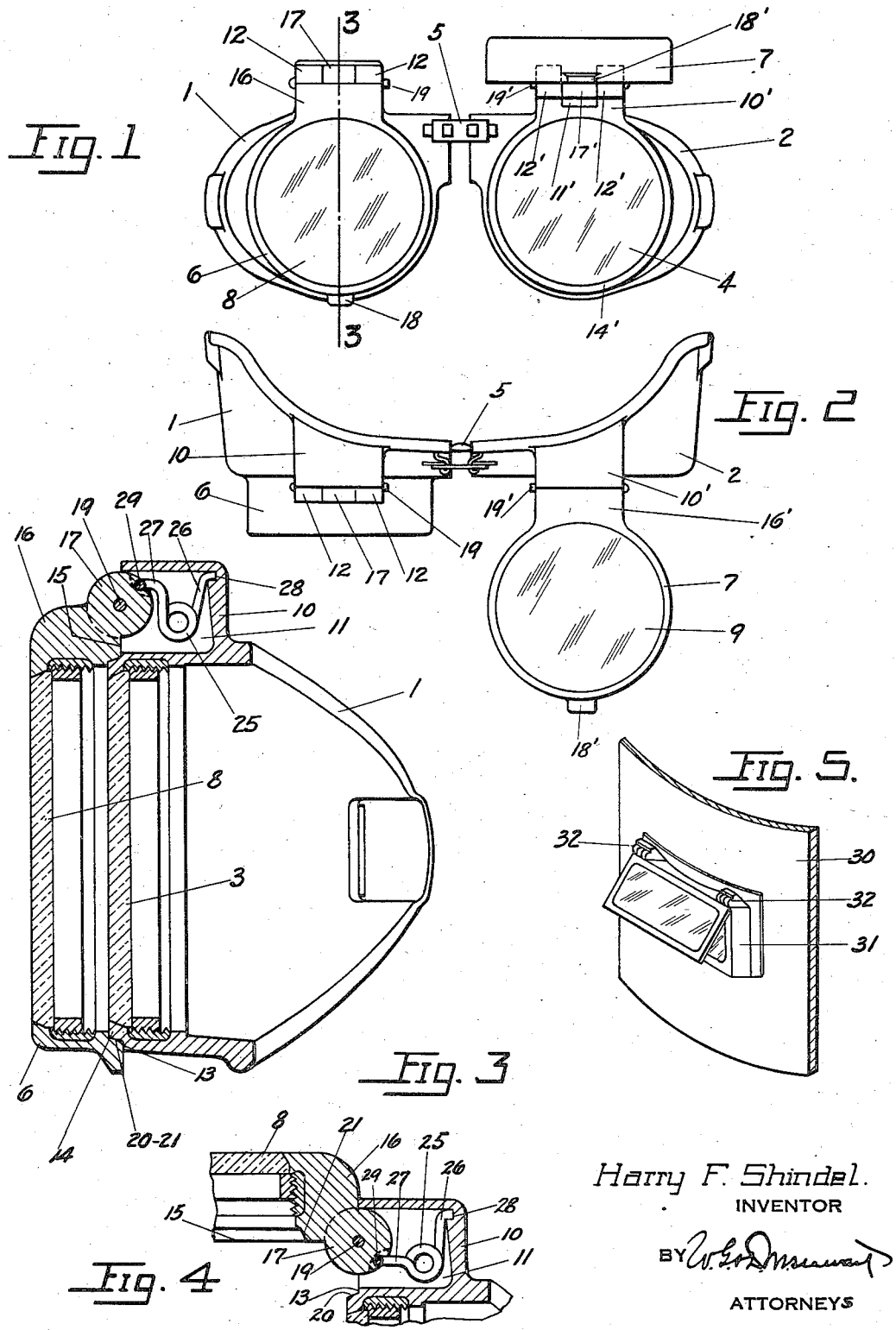

2,031,676

UNITED STATES PATENT OFFICE 2,031,676

EYE PROTECTOR

Harry F. Shindel, Reading, Pa., assignor to Willson Products, Inc., Reading, Pa., a corporation of Pennsylvania Application January 3, 1935, Serial No. 196

7 Claims. (Cl. 2—14)

This invention relates to eye protector devices adapted advantageously for a combination of uses by a variation of the sight protection; goggles or masks for such combined use usually having mounted on them relatively movable frames carrying sight-protecting lenses swingable into and out of cooperative covering relation relative to the lenses of the goggles or mask.

More specifically the present invention relates to an improved construction of such a combination goggles or mask, the main objects being to provide an adequate hinge connection for the covering frame, of neat appearance, and protectively enclosing and hiding a reversely acting spring adapted to hold said covering frame swung out of vision of the wearer, or lowered into covering registering alinement with the main frame lenses, and preferably having a light-sealing rim-junction when thus seated, to insure a fully effective sight-protection cooperation.

With the above main objects outlined, and with others that will later herein appear, this invention comprises the complementary hinge construction with a concealing spring-enclosing chamber, formed on the main and cover frames, as will be more fully described in connection with the accompanying drawing and the novel features thereof specifically set forth in the appended claims.

Fig. 1 shows a front view of a combination pair of goggles embodying the invention in a preferred construction, one covering frame being shown in seated cooperative use with its main frame lens, and the other covering frame raised out of usual vision.

Fig. 2 is a corresponding top view of the parts shown in Fig. 1.

Fig. 3 is a cross-sectional view, taken on the line 3—3 of Fig. 1, showing in an enlarged scale the cover frame in lowered light-sealed rim conjunction.

Fig. 4 is a sectional view similar to Fig. 3, but having parts of the main and cover frames broken away, and showing the cover frame raised.

Fig. 5 shows a face mask with a wide windowed aperture employing a pair of spaced hinges for its movable windowed cover frame.

The combination goggles shown in Figs. 1 to 4, are adapted for use in chipping and welding operations, or any conditions requiring quick change as from clear vision protection to protection against harmful light rays, such combinations however being merely indicative, and subject to changes suitable for other requirements; the present improvements relating to the pivotal connection between the main and covering frames as will now be described.

The goggles shown in the drawing comprise a pair of eye cups 1 and 2, having relatively fixed protection lenses 3 and 4, and a flexible bridge connecting strap 5, and are usually held in place on the face of a wearer as by a head band strap, not shown, connected to the cups in any known manner. Separate cover frames 6 and 7, are shown, with protection lenses 8 and 9, and are indicated as preferably independently rigidly connected to their respective cups 1 and 2, for separate swinging movements. The eye cups 1 and 2, are made for a right and a left eye, but otherwise are identical, and the hinge connection of their separate cover frames 6 and 7 are also identical, so that description of one hinge connection will suffice, cup 1, for the right eye, being selected, and similar parts of cup 2, designated by the same reference figures having the index prime (').

In the construction shown in the drawing, the cup part of the hinge is formed by an integral outer extension 10, on the top surface of the cup 1, recessed to provide a spring-enclosing chamber 11, the spaced side walls of the latter forming pivot-ear lugs 12, 12, extending above the open end of said chamber, which opening lies substantially in the plane of the cover seat 13, surrounding its lens retaining rim 14.

The cover frame 6 is shown as having a rim seat 15 adapted to rest on cover seat 13, and an integral outer rim extension 16 adapted to overlie the opening of cover chamber 11, said extension having a pivot ear lug 17 midway of its width fitted to enter between cup ear lugs 12, 12, and extend into cup chamber 11. Extension 16, on each side of lug 17, is preferably undercut to receive the extensions of cup ear lugs 12, 12; and the cover rim diametrically opposite its extension 16 is shown with a finger engaging extension 18 by means of which it may be conveniently swung on its hinge connection to the cup 1.

The cup ear lugs 12, 12, and cover frame ear lug 17, are apertured in the planes of their respective engaging seats 13 and 15, and as these planes coincide when the frame is seated on the cup, such ear lug apertures will be in alinement to receive a hinge pivot pin 19. This hinged construction insures accurate seating of the swinging cover frame; and where a light-seal junction for such seating is desired, cup seat 13 may be provided with a bevelled extension 20, adapted to telescopingly engage a bevelled recess 21 in cover frame seat 15.

In order that the cover frame 6 may be held in either lowered seated engagement with cup seat 13, or in raised non-covering relation to the latter, the drawing shows a coil spring concealed and protected from harm in spring-enclosing chamber 11 with its axis disposed in spaced parallel relation to hinge pivot pin 19, said coil having diverging torsion-exerting extensions 26 and 27,— extension 26 being engaged in a chamber wall recess 28, and extension 27 engaged in a notch 29 in frame ear lug 17. Notch 29 is eccentric to pivot pin 19, and is located in ear lug 17 so that it will lie in a plane bisecting the axis of spring coil 25 and pivot pin 19 when frame 6 is midway of its swinging movement, further swing of said frame in either direction shifting said notch 29 to one or other side of said bisecting plane to bias the spring to reversely actuate said frame and complete its swing in one or other direction as it passes said midway position.

The hinge above fully described as applicable to combination protective goggles may be otherwise employed. For instance in Fig. 5 a face mask 30 with a wide windowed cover frame 31 is indicated, and in this case it is preferable to use two spaced hinges 32, 32 which may closely follow the construction above described for goggles, and such construction may of course be varied or modified within the spirit of the invention as defined in the following claims:

I claim:

1. The combination of a main windowed eye-protector frame and a relatively movable windowed cover frame therefor, characterized by a hinged connection of said frames consisting of complementary pivot ears on the respective frames, a pin pivotally connecting said ears, and a reversely acting spring having a tensioning end engaging one frame and an opposite-end torsion-exerting extension eccentrically engaging a pivot ear of the other frame to pivotally swing the latter.

2. The combination of a main windowed eye-protector frame and a relatively movable windowed cover frame therefor, characterized by a hinged connection of said frames consisting of complementary pivot ears on the respective frames, a pin pivotally connecting said ears, and a coil spring having a tensioning end engaging one frame with the axis of its coil in spaced parallel relation to said pivot pin and an opposite-end coil torsion-exerting extension eccentrically engaging the other frame to reversely tension the latter during its pivotal swinging movement.

3. The combination of a main windowed eye-protector frame and a relatively movable windowed cover frame therefor, characterized by a hinged connection of said frames consisting of complementary pivot ears on the respective frames, a pin pivotally connecting said ears, a spring-enclosing chamber on one frame, and a coil spring in said chamber with its coil axis spacedly parallel to said pivot pin and having one coil torsion-exerting extension engaging said chambered frame, and another coil torsion-exerting extension eccentrically engaging a pivot ear of the other frame and moved by the latter to reverse the swinging tension of said spring on said movable frame.

4. In combination, a windowed main eye-protector frame having a marginal spring-enclosing chamber and opposite-wall pivot-ear projections at said chamber opening, a relatively movable windowed cover frame for said main frame having a marginal extension covering said chamber opening with a pivot ear projection into the latter, a pivot pin for said ears lying in the plane of the meeting faces of said main and cover frames and hingedly connecting them, a coil spring in said chamber with its axis in spaced parallel relation to said pivot pin and having diverging torsion-exerting extensions, a chamber wall engagement for one spring extension, and an eccentric connection for the other spring extension in the pivot ear of the cover frame, said eccentric connection being moved across the plane bisecting said pivot and coil axis by pivotal movement of its ear so as to reverse the spring pivotal turning tension on said cover frame.

5. A goggle cup having a rim-engaged lens and a cup-wall extension adjacent the latter forming a spring-enclosing chamber with its open end in the plane of said lens and pivot-ear lugs projecting above said plane from opposite walls of said chamber; a cover frame for said goggle cup having a rim-engaged lens movable into and out of covering relation to said cup lens, and a marginal frame extension overlying said chamber opening with a pivot ear lug projecting into the latter; a pivot pin for said ear lugs hingedly connecting said cover frame to said goggle cup; a reversely acting spring for said cover frame enclosed in said chamber and reversely biased by swinging movement of said frame; said cup and frame having telescoping beveled-edge engaging rims forming a light seal for the seated cover frame.

6. A goggle cup having a rim-engaged lens and a cup-wall extension adjacent the latter forming a spring-enclosing chamber with its open end in the plane of said lens and pivot-ear lugs projecting above said plane from opposite walls of said chamber; a cover frame for said goggle cup having a rim-engaged lens movable into and out of covering relation to said cup lens, and a marginal frame extension overlying said chamber opening with a pivot ear lug projecting into the latter; a pivot pin for said ear lugs hingedly connecting said cover frame to said goggle cup; and a reversely acting spring for said cover frame enclosed in said chamber and reversely biased by swinging movement of said frame.

7. The combination of a main frame structure and a relatively movable cover frame structure therefor, characterized by a hinged connection of said frames comprising complementary pivot ears on the respective frame structures, a spring-enclosing chamber forming an extension of the pivot ears of one frame structure, a pivot pin hingedly connecting said ears, and a coil spring in said chamber with its axis in spaced parallel relation to said pivot pin and having diverging torsion-exerting extensions engaging the respective frame structures and adapted to be reversely biased by relative movement of said frame and cover structures.

HARRY F. SHINDEL.